(12) United States Patent  
da Silva Choai

(10) Patent No.: US 7,832,547 B2
(45) Date of Patent: Nov. 16, 2010

(54) CLASSIFYING GAUGE VACUUM FEEDER

(75) Inventor: Orlei da Silva Choai, Santa Catarina (BR)

(73) Assignees: Scanvaegt International A/S, Arhu N (DK); Orlei da Silva Choai, Santa Catarina (BR)

( * ) Notice: Subject to any disclaimer, the term of this patent is extended or adjusted under 35 U.S.C. 154(b) by 353 days.

(21) Appl. No.: 10/576,037

(22) PCT Filed: Sep. 14, 2004

(86) PCT No.: PCT/BR2004/000174

§ 371 (c)(1),
(2), (4) Date: Mar. 15, 2007

(87) PCT Pub. No.: WO2005/035405

PCT Pub. Date: Apr. 21, 2005

(65) Prior Publication Data

US 2008/0056874 A1    Mar. 6, 2008

(30) Foreign Application Priority Data

Oct. 16, 2003    (BR)    .................................... 0304431

(51) Int. Cl.
*B65G 13/02*    (2006.01)
*B65G 15/42*    (2006.01)
*B65G 47/10*    (2006.01)
*B65G 47/46*    (2006.01)

(52) U.S. Cl. .................. 198/689.1; 198/438; 198/428; 198/370.12

(58) Field of Classification Search .............. 198/689.1, 198/438, 428, 370.12
See application file for complete search history.

(56) References Cited

U.S. PATENT DOCUMENTS

| 3,978,642 | A | * | 9/1976 | Smithers | ....................... 53/531 |
| 4,041,676 | A | * | 8/1977 | Smithers | ....................... 53/517 |
| 4,535,584 | A | | 8/1985 | Tsubota | |
| 4,585,113 | A | | 4/1986 | Greenwell | |

(Continued)

FOREIGN PATENT DOCUMENTS

DE    36 10 953 A1    10/1986

(Continued)

OTHER PUBLICATIONS

Russian Office Action dated Jun. 4, 2008.

*Primary Examiner*—Gene Crawford
*Assistant Examiner*—Yolanda Cumbess
(74) *Attorney, Agent, or Firm*—Pearne & Gordon LLP

(57) ABSTRACT

It relates to an equipment to transport and move material which transfer products in bulk into one by one; it receivers a certain amount of pieces (1) and delivers one by one to the next industrial process. This equipment transfers products from a belt conveyor (2) to a weighing system (8) of products on a constant flow; it comprises a rotating cylinder (5) with holes (9) on the cylindrical surface which suck the pieces (1) one by one discharging them in a sequence over a weighing and grading system (8).

45 Claims, 2 Drawing Sheets

U.S. PATENT DOCUMENTS

| | | | |
|---|---|---|---|
| 4,722,432 A * | 2/1988 | Staton | 198/471.1 |
| 4,762,083 A * | 8/1988 | Wadell | 118/16 |
| 5,174,431 A * | 12/1992 | Abler | 198/428 |
| 5,236,502 A * | 8/1993 | Wadell | 118/24 |
| 5,391,386 A * | 2/1995 | Mally | 426/420 |
| 5,749,453 A * | 5/1998 | Doornekamp et al. | 198/400 |
| 5,868,547 A * | 2/1999 | Cohn | 414/789.5 |
| 6,595,739 B1 * | 7/2003 | LaPlace et al. | 414/793 |

FOREIGN PATENT DOCUMENTS

| | | |
|---|---|---|
| RU | 1729918 A1 | 2/1997 |
| SU | 220106 A | 6/1968 |
| SU | 768724 A | 10/1980 |
| SU | 1738175 A1 | 6/1992 |

* cited by examiner

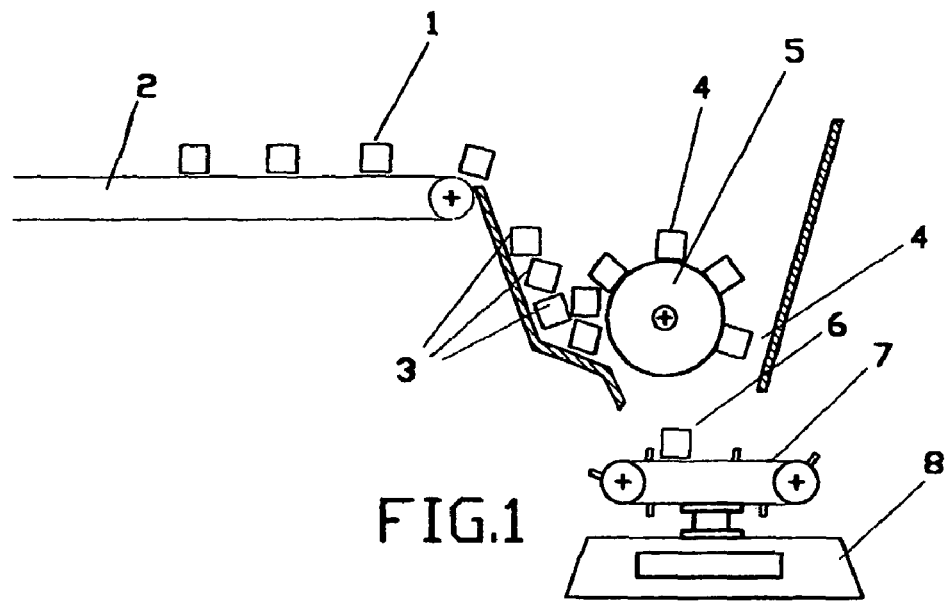
FIG.1
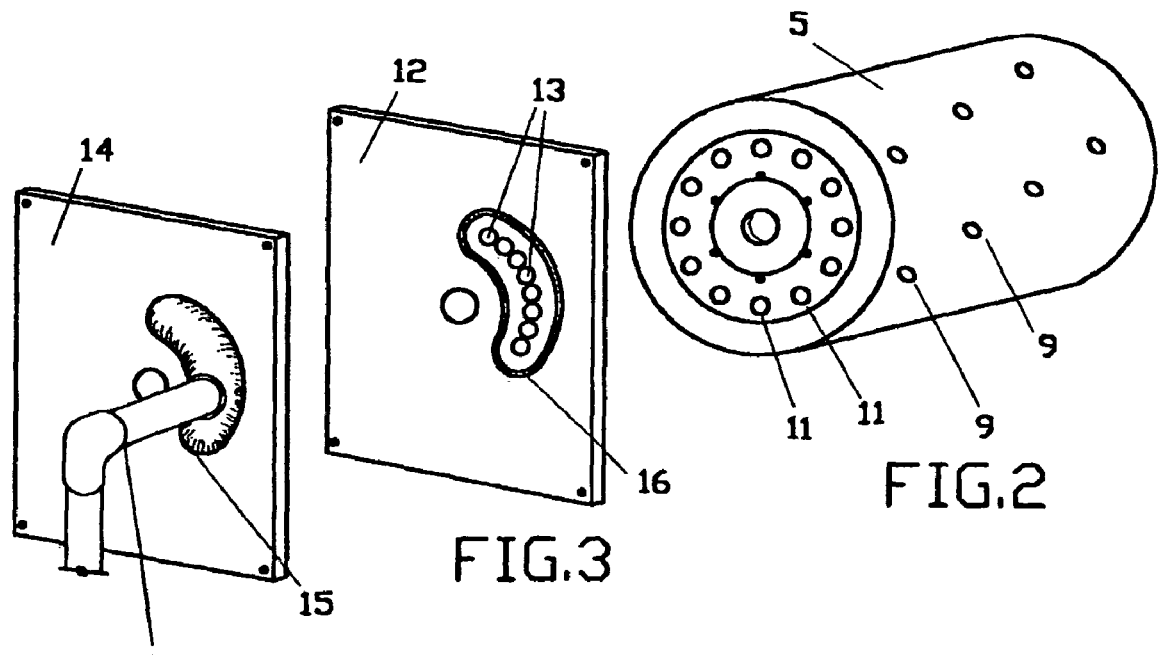
FIG.2
FIG.3
FIG.4

CLASSIFYING GAUGE VACUUM FEEDER

It is related to an equipment to transport and move material, which transfers products in bulk one by one; it receives a certain amount of pieces and delivers one by one to the next industrial process. In the food industry for example a certain amount of boneless chicken breast fillets transported on a belt conveyor are put over a scale one piece at the time.

Solid products of rigid material having a settled geometrical form such as a box, are separated from the continuous flow of a belt conveyor with the help of a mechanical deviator like a hurdle plate, pneumatic or hydraulic piston. A cylinder is also used with dragging plates on the cylinder surface: when the cylinder turns around the solid products that come all together are moved one by one by the plates. So, the products that come all together to the cylinder come out one by one. Equipments which use mechanical processes as the one mentioned above simply don't work when the product is flaccid, without a defined shape as the boneless chicken breast fillet, fish fillet, chicken wings and other.

In the paper industry the cellulose fibers flow on a water stream and then a layer of fibers sticks to a cylinder surface. This cylinder surface is perforated, like a net, and a vacuum is made inside the cylinder in a way that the fiber layer of cellulose sticks to it by suction; after almost a complete turn the fibers, now in a paper form, are disconnected from the cylinder. This suction system on a cylinder-turning surface is also used in the printing industry when there is a need to turn the side of the paper sheet that is on the conveyor. The paper sheet covers the cylindrical surface which sucks it; the paper sheet sticks to and stands close to the cylindrical surface while turning in an angle of approximately 360 degrees when the suction force is interrupted and the paper sheet disconnects from the cylinder and falls over another conveyor.

The equipment hereby described uses the vacuum system on a cylindrical surface of a cylinder to catch item by item from a certain amount of flaccid products and from there put them on top of a tray for individual weighing. The equipment is a transfer device from a transport means to another transport means or to a weighing system. The cylindrical surface of the cylinder has holes, which communicate with a vacuum pump. Using an arrangement as described such items may be gripped individually by the cylinder e.g. the suction hole(s) of the cylinder, transported to another location, e.g. a conveyor band or the like, and released for further processing, transport etc. In this manner the delivered items will be placed individually and for example with a minimum distance between the items on a conveyor band. Even further, the arrangement may serve to even out a flow of items being delivered.

The flaccid items arrive through a conveyor and are accumulated next to the cylindrical surface and each hole sucks one piece; this piece is transported along the rotating cylinder on a distance smaller than the cylinder turn and when the suction is interrupted on this hole the piece falls over the weighing belt. The number of holes as well as their diameter and positioning on the cylinder surface are determined according to the product to be transported: its size, weight and flabbiness degree. The rotation speed adjustment of the cylinder enables to catch and send approximately 50 to 180 pieces per minute one by one to the weighing unit. The inventive act is centered on the use of holes on the cylindrical surface that catches individually by suction solid pieces and flaccid material.

Also, it is noted that the apparatus according to the invention may be utilized for handling items that may differ in size, shape, weight etc. from each other.

FIG. 1 shows schematically the flow of pieces (1) transported by a conveyor (2) and accumulating (3) next to the cylindrical surface of cylinder (5) where they are caught (4) and carried by the rotating cylinder (5). They are released and fall (6) over a belt (7) of the weighing scale (8).

FIG. 2 shows the existing holes (9) on the cylindrical surface of cylinder (5) connected by internal tubes (10) to the side holes (11).

FIG. 3 shows an internal side flange (12) with an arc of holes (13) surrounded by a sealing joint (16).

FIG. 4 shows an external side flange (14) with a vacuum distribution chamber (15) and the suction tube (17) that is connected to the vacuum pump, not shown.

Figure 5:
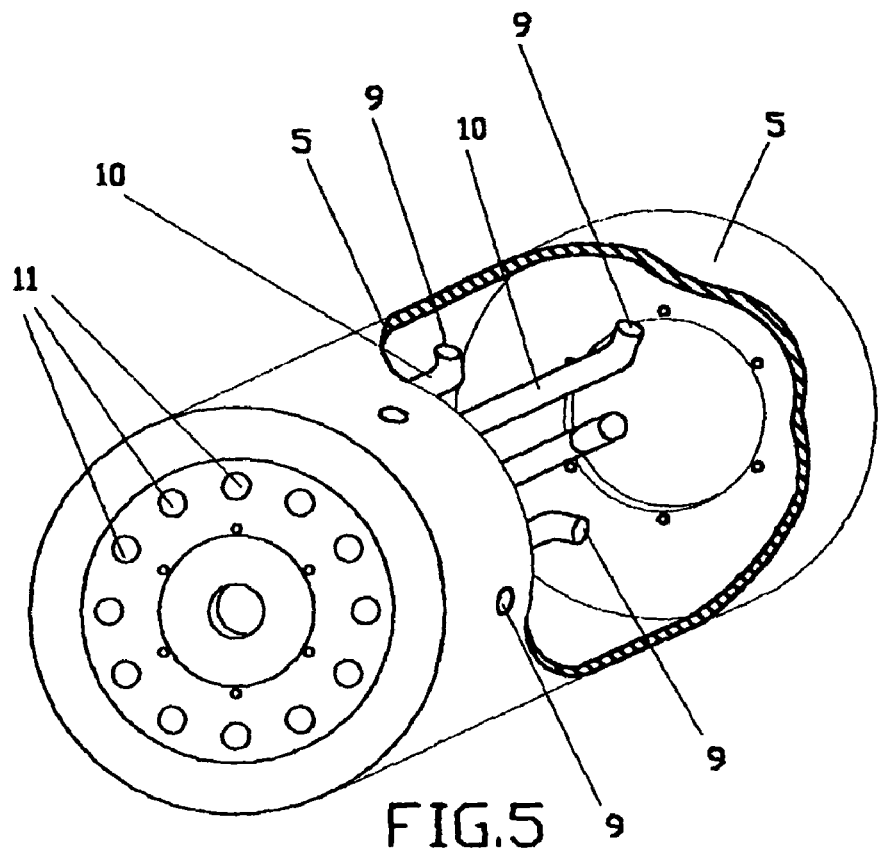
FIG. 5 is cylinder (5) perspective cut view showing, the internal tubes (10) which connect the existing holes (9) on the cylindrical surface and the existing holes (11) on the surface of one of the bases of the cylinder (5).
Figure 6:
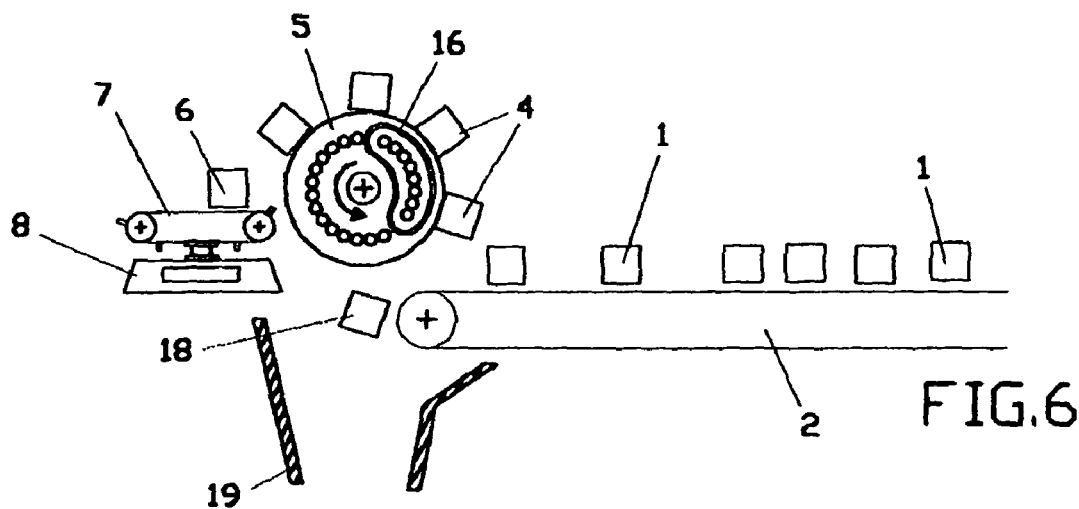

The FIG. 6 shows schematically another embodiment to transport the pieces (1) by means of belt (2) now placed under the cylinder (5) surface when they are caught (4) and carried by the rotating cylinder (5). They are released and fall (6) over a belt (7) of the weighing scale (8). The pieces (18) which were not caught by the cylinder (5) continue their way on belt (2) to discharged point (19) in order to be replaced on the belt (2).

Figure 7:
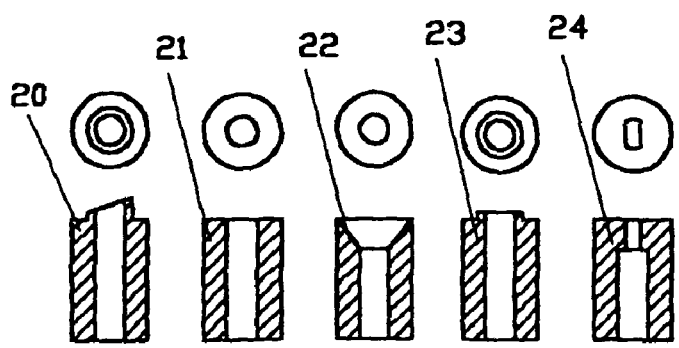

The FIG. 7 shows different types of sockets (20 to 24) which are connected to the holes (9).

The vacuum generated by the vacuum pump, not shown on the drawings, follows by a tube (17), reaches the holes (13) on the internal side flange (12) through the distribution chamber (15) on the external side flange (14) lined up with the existing holes (13) on the internal side of flange (12). With the help of a sealing joint (16) the vacuum is transmitted through the existing holes (11) on the surface of one of the bases of the cylinder (5) until it reaches the existing holes (9) on the cylindrical surface of cylinder (5). To the existing holes (9) on the cylindrical surface are coupled sockets with nozzles having geometrical shape and size according to the material characteristics which is being transported.

The flaccid pieces (1) have substantially similar size and weight; they are transported through a belt (2) until next to the cylindrical surface of cylinder (5); by suction the pieces (1) stick to holes (9) on the rotating cylindrical surface; after a 120 to 210 degree turn the vacuum action on holes (9) is interrupted and the pieces (1) are disconnected one by one from the cylinder (5) and fall over a belt (7) than being transported until they pass over a weighing cell that weighs item (6) by item (6) and grades the items to packing and storing. The holes (9) have sockets (20 to 24) with a proper geometric form for each type of product to be transported. The sockets have a form of a cylinder body with an axial cylindrical hole in which the base in contact with the product has different nozzle shapes such as of an elliptical cross-section (20), of a normal cross-section (21), of a hollow truncated cone (22), of a ring type cylindrical body boss (23), or of a rectangle (24).

Finally, it is noted that the apparatus may comprise one cylinder for transporting items, which cylinder may be designed for handling items e.g. in parallel, e.g. handling items in two or more lanes or tracks. It is also noted that the holes in the surface of the cylinder are placed in such a manner that only one item is picked up at a time for each track or line of items being handled.

What is claimed is:

1. A vacuum feeder system comprising:
   a vacuum interface for connecting to a vacuum source;
   a transfer device for transferring flaccid food pieces from a first transport means to a second transport means or to a weighing system, wherein the flaccid food pieces are delivered to said transfer device via the first transport means, said transfer device including a cylinder body that can be rotated, wherein said cylinder body is provided with a plurality of holes through an outer surface of said cylinder body; and
   a plurality of vacuum connection means provided inside said cylinder body for connecting said vacuum interface to said holes, wherein
   said transfer device transfers the flaccid food pieces from the first transport means to the second transport means or to said weighing system by rotating said cylinder body while the flaccid food pieces are held in place by a vacuum provided at holes in communication with the flaccid food pieces, and wherein
   said flaccid food pieces are delivered to said transfer device in an accumulated and/or unorderly form, and wherein
   said vacuum feeder system is configured for accumulating said flaccid food pieces next to said cylinder body.

2. The system according to claim 1, wherein said flaccid food pieces are delivered to said transfer device in an unorderly form.

3. The system according to claim 1, wherein said flaccid food pieces are delivered to said transfer device in an accumulated form.

4. The system according to claim 1, wherein said vacuum interface includes a flange coupled to said vacuum connection means.

5. The system according to claim 4, wherein said flange includes a vacuum distribution chamber.

6. The system according to claim 1, wherein each one of said vacuum connection means includes means that are placed inside said cylinder.

7. The system according to claim 1, further comprising a plurality of tubes provided within said cylindrical body, wherein each one of said vacuum connection means includes one of said tubes for connecting to at least one of said holes.

8. The system according to claim 7, wherein each one of said tubes are connected to the cylinder body and each one of said tubes connect one of the holes on the outer surface to a corresponding one of a plurality of additional holes arranged in a circle on an end of the cylinder body.

9. The system according to claim 8, wherein said vacuum interface includes a flange that faces the end of the cylinder having the additional holes and has a passage arranged in an arc having a radius substantially equal to the radius of the circle on which the additional holes are arranged.

10. The system according to claim 9, wherein the length of the arc determines the angular distance for which the flaccid food pieces are held in place by the vacuum at the holes on the cylinder body.

11. The system according to claim 1, wherein each one of said vacuum connection means is connected to the cylinder body, and wherein each one of said vacuum connection means connects one of the holes on the cylindrical body outer surface to a corresponding one of a plurality of additional holes arranged on an end of the cylinder body.

12. The system according to claim 11, wherein said vacuum interface includes a flange that faces the end of the cylinder having the additional holes and has a passage arranged in a pattern corresponding to the additional holes.

13. The system according to claim 1, wherein each of said holes on the cylindrical surface has a socket attached thereto and provided on the surface of said cylinder body for contacting and holding the pieces.

14. The system according to claim 13, wherein said sockets include one or more of: an oval nozzle resulting from an inclined cut at an end of the cylinder body forming the socket, a circular nozzle formed by a normal cross-section of the cylinder body forming the socket, a hollow truncated cone nozzle formed by bevelling the normal cross-section of a straight end of the cylinder body forming the socket, a circular nozzle formed by a ring type cylindrical boss on a top of the cylinder body forming the socket and/or a rectangular nozzle on a top end of the cylinder body forming the socket.

15. The system according to claim 1, wherein the flaccid food pieces that are supplied via the first transport means to a transfer location and are accumulated at the transfer location until held by the transfer device.

16. The system according to claim 1, wherein said cylinder body is placed at the transfer location with an axis placed essentially horizontally.

17. The system according to claim 1, wherein said flaccid food pieces may differ in size, shape, thickness, and/or weight from each other.

18. The system according to claim 1, wherein flaccid food pieces that are not caught by the rotating cylinder body can continue to a discharge point in order to be placed back on the first transport means.

19. The system according to claim 1, wherein said flaccid food pieces that are delivered by said transfer device are being graded.

20. A vacuum feeder system comprising:
    a transfer device for transferring materials or pieces from a first transport means to a second transport means or to a weighing system, wherein the materials or pieces are delivered to said transfer device via the first transport means in an unorderly and/or accumulated form, said transfer device including:
       a rotating cylinder body having a plurality of first holes on a surface of the cylindrical body, said cylinder body also have a plurality of second holes on an end of said cylinder body, and
       a plurality of connections, wherein each one of said first holes is connected to a corresponding one of said second holes via one of said plurality of connections;
    a vacuum interface connected to a vacuum source and connected to said transfer device, wherein said second holes on said transfer device are connected to said vacuum source through a vacuum path, and wherein
    said transfer device transfers the materials or pieces from the first transport means to the second transport means or to the weighing system by rotating the cylinder body and by utilizing vacuum at said first holes for holding said materials or pieces, wherein
    the materials or pieces are released from said holding by removing the vacuum at said first holes to transfer the materials or pieces to the second transport means or to the weighing system, and wherein
    said vacuum feeder system is configured for accumulating said materials or pieces that are delivered to said transfer device, via the first transport means, next to said rotating cylinder body.

21. The system according to claim 20, further comprising a plurality of sockets, wherein each of said first holes has one of said sockets attached thereto and provided on the surface of said cylinder body for contacting and holding the materials or pieces.

22. The system according to claim 21, wherein said sockets include one or more of: an oval nozzle resulting from an inclined cut at an end of the cylinder body forming the socket, a circular nozzle formed by a normal cross-section of the cylinder body forming the socket, a hollow truncated cone nozzle formed by beveling the normal cross-section of a straight end of the cylinder body forming the socket, a circular nozzle formed by a ring type cylindrical boss on a top of the cylinder body forming the socket and/or a rectangular nozzle on a top end of the cylinder body forming the socket.

23. The system according to claim 20, wherein said cylinder body is placed at the transfer location with an axis placed essentially horizontally.

24. The system according to claim 20, wherein the materials or pieces that are supplied via the first transport means to a transfer location and are accumulated at the transfer location until held by the transfer device.

25. The system according to claim 20, wherein the materials or pieces may differ in size, shape, or weight from each other.

26. The system according to claim 20, wherein materials or pieces that are not held by the transfer device continue to a discharge point in order to be placed back on the first transport means.

27. The system according to claim 20, wherein the materials or pieces that are delivered by said transfer device are graded.

28. The system according to claim 20, wherein said plurality of connections are tubes that are provided within said cylinder body.

29. The system according to claim 20, wherein said materials or pieces are delivered to said transfer device in an unorderly form.

30. The system according to claim 20, wherein said materials or pieces are delivered to said transfer device in an accumulated form.

31. The system according to claim 20, wherein said second holes are arranged in a circle, and wherein said vacuum path is formed in an arc having a radius substantially equal to the radius of the circle on which the second holes are arranged.

32. The system according to claim 31, wherein the length of said arc determines the angular distance for which the materials or pieces are held by the vacuum at the holes on the cylinder body.

33. A vacuum feeder system comprising:
a transfer device for transferring materials or pieces from a first transport means to a second transport means or to a weighing system, wherein the materials or pieces are delivered to said transfer device via the first transport means in an unorderly and/or accumulated form, said transfer device including:
a rotating cylinder body having a plurality of first holes on a surface of the cylindrical body, said cylinder body also have a plurality of second holes connected to a vacuum interface, and
a plurality of connections, wherein each one of said first holes is connected to a corresponding one of said second holes via one of said plurality of connections;
wherein said vacuum interface is connected to a vacuum source, and wherein
said transfer device transfers the materials or pieces from the first transport means to the second transport means or to the weighing system by rotating the cylinder body and by utilizing vacuum at said first holes for holding said materials or pieces, wherein
the materials or pieces are released from said holding by removing the vacuum at said first holes to transfer the materials or pieces to the second transport means or to the weighing system, and wherein
said vacuum feeder system is configured for accumulating said materials or pieces that are delivered to said transfer device, via the first transport means, next to said rotating cylinder body.

34. The system according to claim 33, further comprising a plurality of sockets, wherein each of said first holes has one of said sockets attached thereto and provided on the surface of said cylinder body for contacting and holding the materials or pieces.

35. The system according to claim 34, wherein said sockets include one or more of: an oval nozzle resulting from an inclined cut at an end of the cylinder body forming the socket, a circular nozzle formed by a normal cross-section of the cylinder body forming the socket, a hollow truncated cone nozzle formed by bevelling the normal cross-section of a straight end of the cylinder body forming the socket, a circular nozzle formed by a ring type cylindrical boss on a top of the cylinder body forming the socket and/or a rectangular nozzle on a top end of the cylinder body forming the socket.

36. The system according to claim 33, wherein said cylinder body is placed at the transfer location with an axis placed essentially horizontally.

37. The system according to claim 33, wherein the materials items or pieces that are supplied via the first transport means to a transfer location and are accumulated at the transfer location until held by the transfer device.

38. The system according to claim 33, wherein the materials or pieces may differ in size, shape, or weight from each other.

39. The system according to claim 33, wherein materials or pieces that are not held by the transfer device continue to a discharge point in order to be placed back on the first transport means.

40. The system according to claim 33, wherein the materials or pieces that are delivered by said transfer device are graded.

41. The system according to claim 33, wherein said plurality of connections are tubes that are provided within said cylinder body.

42. The system according to claim 33, wherein said second holes are arranged in a circle, and wherein a vacuum path is formed in an arc having a radius substantially equal to the radius of the circle on which the second holes are arranged.

43. The system according to claim 42, wherein the length of said arc determines the angular distance for which the materials or pieces are held by the vacuum at the holes on the cylinder body.

44. . The system according to claim 33, wherein said materials or pieces are delivered to said transfer device in an unorderly form.

45. . The system according to claim 33, wherein said materials or pieces are delivered to said transfer device in an accumulated form.

* * * * *

UNITED STATES PATENT AND TRADEMARK OFFICE
CERTIFICATE OF CORRECTION

| | | |
|---|---|---|
| PATENT NO. | : 7,832,547 B2 | Page 1 of 1 |
| APPLICATION NO. | : 10/576037 | |
| DATED | : November 16, 2010 | |
| INVENTOR(S) | : da Silva Choai | |

It is certified that error appears in the above-identified patent and that said Letters Patent is hereby corrected as shown below:

In column 6, line 31, please delete the word "items" after the word --rials-- and before the word --or--

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,832,547 B2 | Page 1 of 1 |
| APPLICATION NO. | : 10/576037 | |
| DATED | : November 16, 2010 | |
| INVENTOR(S) | : da Silva Choai | |

It is certified that error appears in the above-identified patent and that said Letters Patent is hereby corrected as shown below:

On the title page, under "Assignees", please change the address of "Scanvaegt International A/S" to read -Arhus N (DK)-

In column 6, line 31, please delete the word "items" after the word -rials- and before the word -or- Signed and Sealed this Fifteenth Day of February, 2011

David J. Kappos
*Director of the United States Patent and Trademark Office*